United States Patent

[11] 3,581,624

| [72] | Inventors | Robert A. Stone<br>Stratford, Conn.;<br>Frederick C. Beurer, Hamden, Conn. |
|---|---|---|
| [21] | Appl. No. | 837,448 |
| [22] | Filed | June 30, 1969 |
| [45] | Patented | June 1, 1971 |
| [73] | Assignee | United Aircraft Corporation<br>East Hartford, Conn. |

[54] TELESCOPING ROTOR SHAFT
13 Claims, 3 Drawing Figs.

[52] U.S. Cl. ..................................... 91/44,
92/24, 244/7
[51] Int. Cl. .................................................. F15b 15/26
[50] Field of Search ........................................ 91/44;
92/24, 106, 111, 117; 188/67; 244/7; 74/531;
287/52.06; 294/86.25, consulted cl. 24

[56] References Cited
UNITED STATES PATENTS

| 557,686 | 4/1896 | Meissner .................... | 92/111X |
| 730,460 | 6/1903 | Irvine et al. ................. | 294/86.25X |
| 2,986,122 | 5/1961 | Shattuck ..................... | 92/106X |
| 3,139,004 | 6/1964 | Haumann ................... | 92/106X |
| 3,420,144 | 1/1969 | Berry ......................... | 92/24X |

FOREIGN PATENTS

| 609,153 | 9/1948 | Great Britain ............... | 244/7 |

Primary Examiner—Laverne D. Geiger
Assistant Examiner—Edward J. Earls
Attorney—Vernon F. Hauschild ABSTRACT: A telescoping rotor shaft including concentric shafts mounted for rotation with one another to drive the rotor and for translation with respect to one another for rotor extension and retraction and wherein one of the shafts includes spaced and angularly opposed conical seats which are engaged by mating conical rings when the rotor is in its extended position to thereby provide spaced supports for the rotor shafts and to lock the shaft in its extended position.

FIG.3 RETRACTED POSITION

INVENTORS
ROBERT A. STONE
FREDERICK C. BEURER
BY Vernon F Hauschild
ATTORNEY

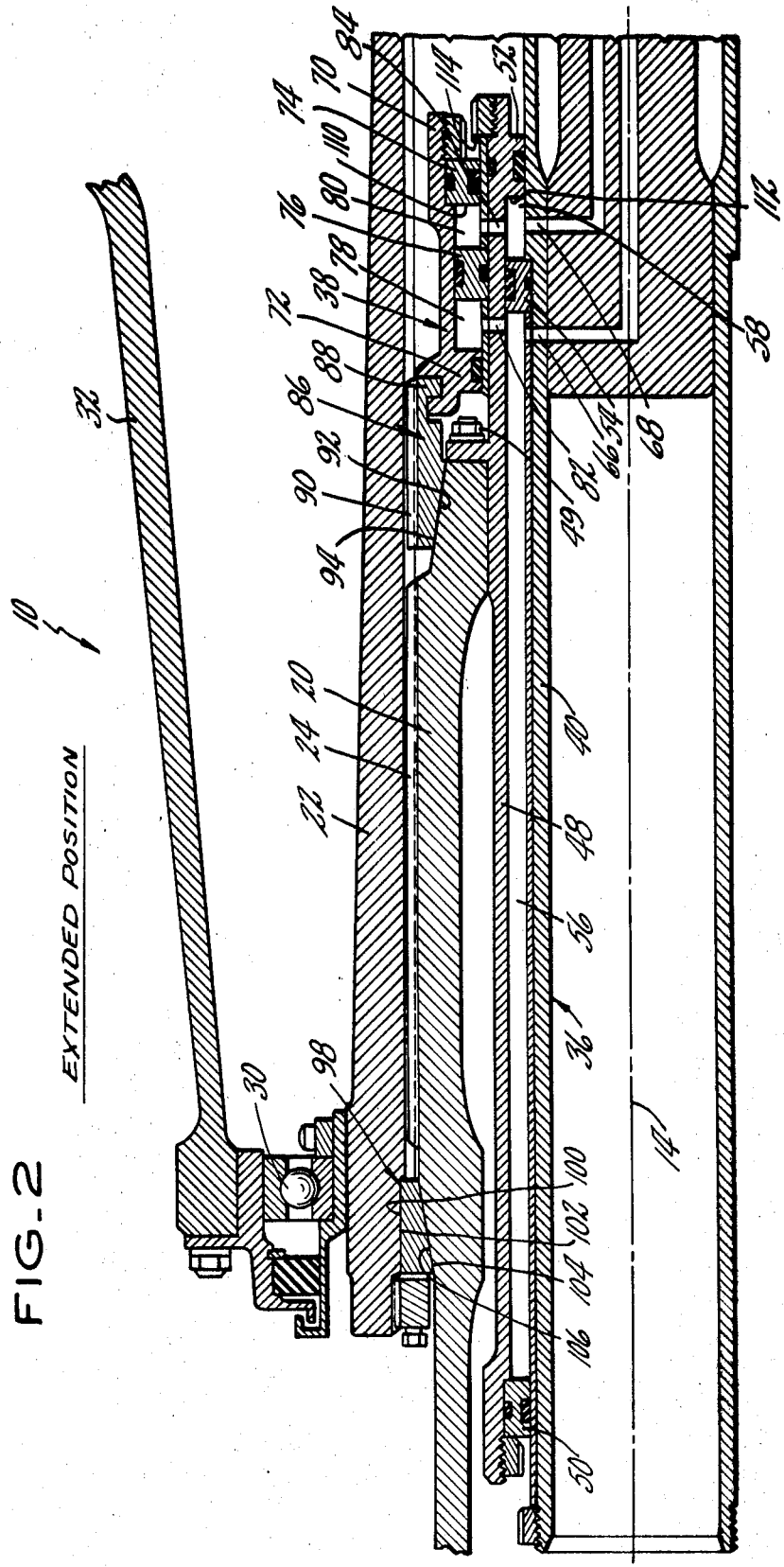

TELESCOPING ROTOR SHAFT

BACKGROUND OF THE INVENTION

1. Field of Invention

This invention relates to telescoping or folding helicopter rotors or aeronautical propellers and more particularly to the shafting which permits this rotor action and which securely supports and locks the rotor shafting when in its extended position.

2. Description of the Prior Art

In the rotor art, and in particular aeronautical rotors used on convertiplanes wherein the rotor must be extended to permit the aircraft to operate as a helicopter and to be retracted when the aircraft is in fixed wing or other mode of operation, the providing of mechanism to perform this rotor extending and retracting function has been difficult to accomplish. An aeronautical rotor, such as a helicopter rotor, must be supported by a shaft system for rotation to permit the rotor to generate lift and to also permit the rotor to change pitch and the like for aircraft control purposes. Accordingly, the rotor shafting system encounters every conceivable type of shaft loading and therefore must be capable of withstanding such loading. For example, bending moment loading is imposed upon the shaft due to the moment which the rotor establishes with respect to the fuselage during flight. In addition, axial loading is imposed upon the rotor shaft due to the lifting force which the rotor imposes upon the fuselage through this shafting. Still further, torsional loading is imposed upon this shafting since the rotor is driven by an engine therethrough to cause the rotor to rotate and hence produce the necessary lift. These various types of helicopter loading are complicated by the fact that such loading is imposed upon the shaft both as a steady state loading and as a vibratory loading caused by the dynamics of the rotor.

This heavy and multiple-type shaft loading demands a shaft construction of such a nature that all play or looseness be eliminated therefrom when the rotor is in its extended position so as to avoid fretting which would otherwise occur between adjacent and mating metal parts if this play or interpart looseness were not eliminated.

In the past, to provide the necessary rigid shafting system, it has been practice to cause the entire rotor with its transmission system to be elevated out of the fuselage as a unit to an extended position and retracted into the fuselage as a unit to a retracted position. Such constructions are shown in U.S. Pat. Nos. 3,370,809 and 2,481,502 and present substantial problems of weight and excessive mechanical complication because of the overall weight of the rotor, shafting and complete transmission system which must be so moved thereby.

To avoid having to move the entire rotor system, telescoping rotor shafts have been utilized to permit rotor extension and retraction; however, they present problems with respect to rigidly supporting the rotor in place to prevent the aforementioned fretting, insuring that the rotor remains in the extended position in spite of an actuator system failure, and being capable of accomplishment without the need for an extremely heavy shafting system to be capable of withstanding the necessary loading. For example, in U.S. Pat. No. 2,094,105, a single external hydraulic cylinder piston unit is connected to the rotor shafting to establish telescoping motion therein. Such an offset system will cause a crabbing motion of the telescoping shafts and will present problems of shaft binding.

SUMMARY OF THE INVENTION

A primary object of the present invention is to provide improved telescoping rotor shafts which are light in weight, which are simple and dependable in operation, and which provide substantial support when the rotor is extended to prevent fretting between mating metallic parts and which locks the rotor in its extended position.

In accordance with the present invention, the extended rotor is supported in position by concentric shafting which is joined and supported by axially spaced split cone shaped rings which mate with conical seat sections on one of the shafts and extend between the two shafts and which are of selected contouring to provide the shafting with spaced support about its axis of rotation.

In accordance with another aspect of the present invention, the telescoping shafting is locked in position when the rotor is in its extended position.

In accordance with still another aspect of the present invention, the telescoping shafting is prevented from telescoping further when the rotor is in its fully extended position.

In accordance with still a further aspect of the present invention, the rotor shafting lock system is hydraulically actuated and is fabricated so as to continue to perform its locking function despite hydraulic system failure.

In accordance with still a further aspect of this invention, the joint so formed between the telescoping rotor shafts is not adversely affected by rotor lifting, bending, and torsional loading.

BRIEF DESCRIPTION OF THE DRAWINGS

FIG. 2 is a showing of the telescoping shaft actuation, retention, and locking system in the rotor extended position.

FIG. 3 is a showing of the telescoping shaft actuation, retention, and locking system in greater particularity in the rotor retracted position.

DESCRIPTION OF THE PREFERRED EMBODIMENT

Figure 1:
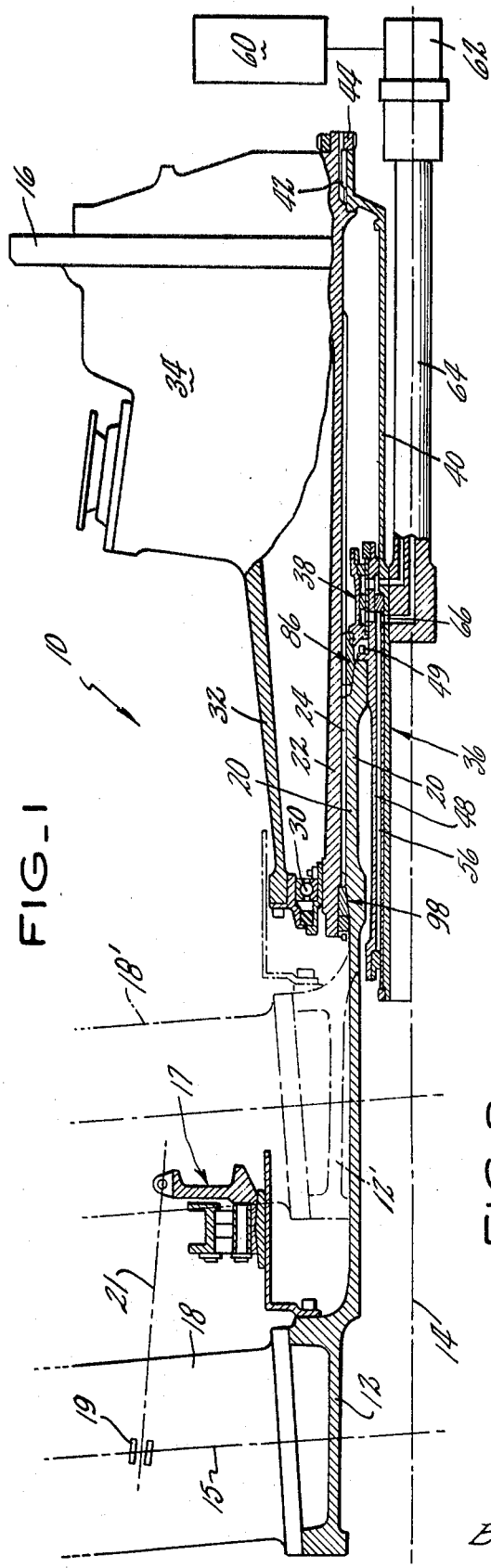
FIG. 1 is a showing of a modern aircraft helicopter rotor of the retractable-type utilizing the invention.
Figure 1:
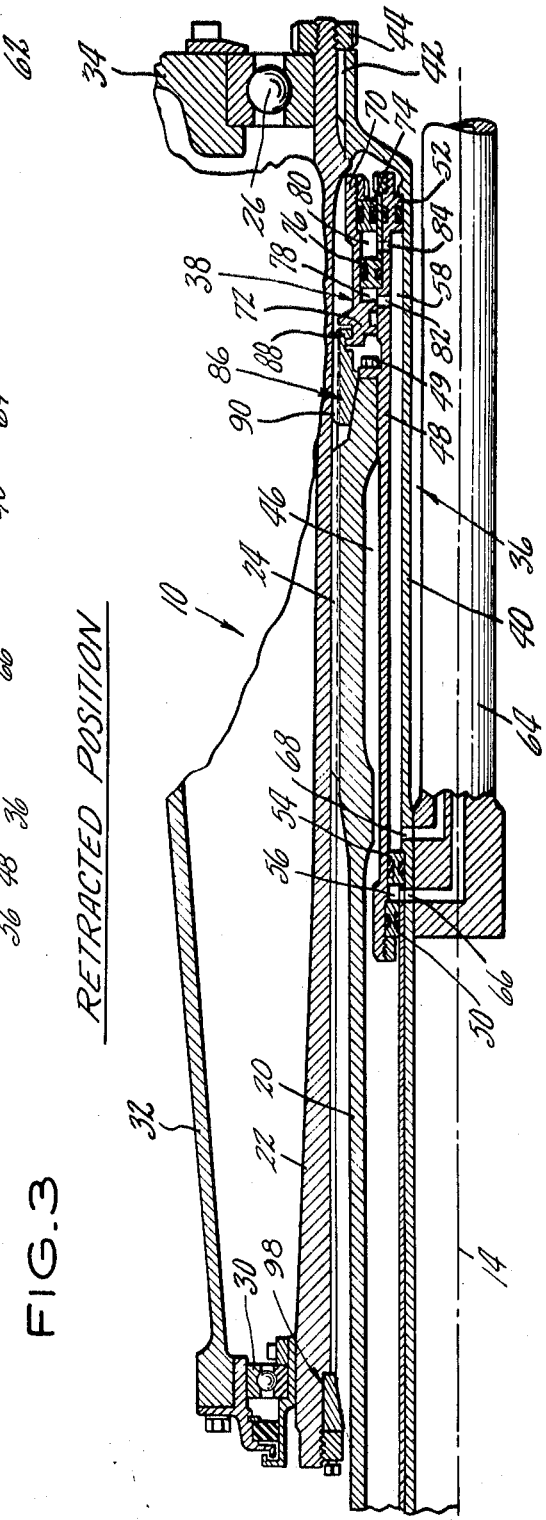

Referring to FIGS. 1 through 3 we see aeronautical rotor assembly 10, which is depicted as a helicopter rotor comprising a hub member 12 mounted for rotation about axis of rotation 14 and projecting upwardly from and supported from fuselage 16 of the aircraft. A plurality of rotor blades 18 project outwardly from hub 12 and rotate therewith to perform the helicopter lift and control function.

Blades 18 are mounted from hub 12 for pitch change motion about feathering axis 15 and are caused to so feather by conventional swash plate mechanism 17 which is connected to conventional pitch horn 19 through pivot link 21.

Since rotor 10 is of the telescoping-type, many of the parts are shown in their rotor extended positions in FIG. 2 and in their rotor retracted positions in FIG. 3.

Hub 12 is connected to or may be integral with rotor shaft member 20 which is in turn supported within outer rotor shaft member 22 and joined thereto through axially extending splines 24 so that the two rotor shafts 20 and 22 are mounted to rotate with one another about axis 14 when the rotor revolves in its lift performing function and shaft 20 is capable of translating along axis 14 with respect to shaft 22 in telescoping fashion to cause rotor hub 12 and blades 18 to extend between their extended full line position and their retracted phantom line position.

Outer rotor shaft 22 is supported by bearings 26, and 30, each of which is a conventional antifriction bearing, such as a ball or roller bearing, and supported concentrically about axis 14 by reduction gear or transmission housing 32. A conventional prime mover, such as an engine (not shown), drives rotor shafts 22 and 20 through transmission assembly 34, which may be of the type more fully described in U.S. Pat. No. 2,911,851 and in this fashion rotor 10 is caused to rotate about axis 14 to generate lift.

Hydraulically operated cylinder piston mechanism 36 serves to cause shaft 20 to translate or telescope with respect to shaft 22 and hydraulically operated cylinder piston mechanism 38 serves to lock shaft 20 in position when fully extended in fashions now to be described.

Telescoping actuator 36 includes shaft member 40 which is mounted concentrically about axis 14 and connected to outer rotor shaft 22 through spline members 42 and is held in position by nut member 44. Shaft 40 is positioned in spaced relation from shaft 22 and coacts therewith to define annular chamber 46 therebetween. Shaft 40 is accordingly mounted for rotation with shaft 22 about axis 14. Shaft 48 is positioned in annular chamber 46 with shaft 20 and is connected thereto by mechanical fasteners such as bolt and nut members 49, to both rotate therewith and to translate therewith along axis 14.

Shafts 40, 48, 20 and 22 are all preferably of circular cross section and concentric about axis 14. Shaft 48 has sleeve or skirt members 50 and 52 projecting therefrom which cooperate with ring member 54, which projects from shaft 40, to cooperate with shafts 40 and 48 in forming annular chambers 56 and 58 therebetween. It will therefore be seen that by selectively introducing hydraulic fluid into either chamber 56 or 58 through conventional means, such as signal valve 60, hydraulic slip ring 62 and tubing member 64 which leads to aperture 66 and hence chamber 56, or to aperture 68 and hence chamber 58, connected shafts 48 and 20 can be made to translate along axis 14 and thus either extend or retract respectively, rotor assembly 10.

Hydraulic cylinder piston unit 38 serves to lock rotor shaft 22 in its extended position and to unlock the shaft for retracting in a fashion to be described hereinafter, and includes sleeve member 70, which envelopes shaft 48 and which has ring or skirt members 72 and 74 projecting therefrom and cooperating therewith and with ring member 76, which projects from and is supported by shaft 48, to define annular chambers 78 and 80. It will therefore be seen that by selectively admitting hydraulic fluid through aperture 82 into annular core locking chamber 78 or through aperture 84 into annular core unlocking chamber 80, sleeve 70 can be caused to translate along axis 14 with respect to sleeve 48 and carry conical locking ring 86 therewith. It will be noted that cone locking and unlocking ring 86, which is preferably split for assembly purposes, is connected to sleeve 70 at joint 88 and includes splines 90 in its outer surface which coact with splines 24 on shaft 22 to connect cone ring 86 to shaft 22 for rotation therewith and for translation with respect thereto along axis 14. The outer splined surface of cone ring 86 accordingly bears against the inner splined surface of shaft 22, and the inner conical surface 92 of ring 86 bears against and cooperates with mating cone seat 94 of shaft 20 to lock shaft 20 in its extended position in a fashion to be described hereinafter.

Conical ring 98 is positioned at the outer end of shaft 22 and is connected thereto for rotation therewith and includes an outer surface 100 which bears against a mating surface 102 of shaft 22 and also includes a tapered or conical inner surface 104 which bears against and mates with a corresponding cone seat 106 of shaft 20. It will be noted that cone seats 106 and 94 are axially spaced along axis 14 and, as best shown in FIG. 2, serve to support shaft 20 from shaft 22 and to form a joint therebetween which causes the shaft to be virtually integral when shaft 22 is in its fully extended telescoping position. It will be noted that the angularity of cone seats 106 and 94 are opposed or reversed with respect to axis 14 and that the coaction of cone seat 106 and cone ring 98 prevent shaft 20 from telescoping beyond its fully extended position shown in FIG. 2, without respect to rotor lift loading on shaft 22.

It will also be noted that cone ring 86 is self-locking and will not be disposed to unlock shaft 22 despite the fact that hydraulic fluid may be lost with respect to its actuating hydraulic system 38.

OPERATION

With rotor 10 in its fully retracted or stowed position shown in phantom in FIG. 1, the rotor will be caused to extend to its extended solid line position by introducing hydraulic fluid into chamber 56 through aperture 66 via the selective hydraulic fluid dispensing system 60—64 previously described, and which may be of the type shown in greater particularity in U.S. Pat. No. 2,925,130. This hydraulic pressure will cause shafts 48 and 20 to telescope upwardly or to the left as shown in the drawings to their FIG. 1 or 2 solid line positions. When port 82 passes ring 54 and hence comes into communication with chamber 56, the hydraulic fluid is then sequentially directed therethrough into chamber 78 to cause hydraulic actuator 38 to translate leftwardly carrying locking cone ring 86 therewith into its FIG. 2 position so as to lock shaft 20 in its fully extended position and so as to cooperate with cone ring 98 in supporting shaft 20 in its fully extended position in spaced axial relation so as to prevent fretting of any of the interconnected metallic parts due to motion therebetween caused by the various rotor loadings previously described.

To retract rotor 10 to its FIG. 1 phantom line position, hydraulic actuating fluid is selectively introduced into chamber 58 through aperture 68 and thence through aperture 84 into cone unlocking chamber 80. Since the exposed surface 110 of chamber 80 is greater than the exposed surface 112 of chamber 58, piston mechanism 38 will move rightwardly to thereby cause conical locking ring 86 to also move rightwardly to unlock the shaft 20, and hence shaft 48, for retraction. After skirt 74 bottoms out against projection 114, thereby inactivating prime mover 38, shafts 20 and 48 will commence to translate from their extended full line position in FIG. 1 to their retracted phantom line position to thereby retract rotor 10.

It will accordingly be seen that hydraulic actuator or reaction member 36 serves to cause shaft 20 to telescope with respect to shaft 22 and piston mechanism 38 serves to lock shaft 20 in its fully extended position and to unlock it from that position. It will further be seen that cone shaped rings 86 and 98 extend between shafts 20 and 22 in the rotor extended position and coact therewith to form a tight, virtually integral joint between the shafts which both prevents the shaft from further extension and from retraction in case of hydraulic system failure.

We claim:
1. A telescoping rotor shaft including:
   1. a first shaft mounted for rotation about an axis of rotation,
   2. a second shaft concentric with said first shaft and mounted for rotation therewith and for translation with respect thereto in telescopic fashion and having axially spaced conical seats thereon,
   3. a rotor connected to said second shaft,
   4. a first wedge-shaped ring supported and positioned to mate with first of said conical seats on said second shaft when said second shaft is in one of its end positions of translation,
   5. a second wedge-shaped ring supported and positioned to mate with said second conical seat on said second shaft when said second shaft is in said end position of translation so that said second shaft and hence said rotor is supported in position by the axially spaced wedge rings coacting with the axially spaced conical seats of said second shaft.

2. Apparatus according to claim 1 wherein said conical seats are of opposite inclination and including means to bring said second ring into engagement with said second conical seat after said first conical seat and said first ring are in engagement.

3. A telescoping rotor shaft including:
   1. a first shaft mounted for rotation about an axis of rotation,
   2. a second shaft mounted for rotation with said first shaft and for translation along said axis of rotation with respect thereto and shaped to include opposed tapered surfaces positioned in spaced relation along said axis of rotation,
   3. a first tapered ring connected to and carried by said first shaft and positioned to engage the first of said tapered surfaces on said second shaft in mating relation when said second shaft is in an end position of translation, 4. a second tapered ring movable to extend between said first and second shafts and to engage said second tapered surface of said second shaft in mating relation when said second shaft is in said end position of translation so that said second shaft is supported from said first shaft through said axially spaced tapered rings coacting in spaced relation between said shafts.

4. Apparatus according to claim 3 and including hydraulic means to cause said second shaft to translate with respect to first shaft.

5. Apparatus according to claim 4 and including hydraulic means to actuate said second ring into and out of engagement with said second tapered surface of said second shaft when said second shaft is in said end position of translation.

6. Apparatus according to claim 5 and wherein said tapered ring actuating means includes means to apply a hydraulic retaining force against said second tapered ring when so engaging said second shaft.

7. A telescoping rotor shaft mechanism including:
1. first rotor shaft mechanism mounted for rotation about an axis of rotation and shaped to define an annular chamber therewithin concentric about said axis,
2. second shaft mechanism shaped to define axially spaced and angularly opposed cone seats and positioned in said annular chamber and mounted to rotate with said first shaft mechanism about said axis of rotation and to translate with respect thereto along said axis of rotation between a first end position wherein said rotor is retracted and a second end position wherein said rotor is extended,
3. a rotor connected to said second shaft member,
4. a first cone ring positioned in said annular chamber and carried by said first shaft mechanism and positioned to coact with one of said second shaft cone seats when said second shaft is in said second end position,
5. and a second cone ring positioned in said annular chamber and actuatable to a position to extend between said shaft members and to engage said second cone seat of said second shaft mechanism when said second shaft mechanism is in said second end position,
6. sequencing hydraulic means actuatable to cause said second shaft mechanism to move from said first to said second position and then to cause said second cone ring to coact with said second cone seat of said second shaft mechanism to lock said second shaft mechanism in position with respect to said first shaft mechanism in said second position of said second shaft,
7. and sequencing hydraulic means to unlock said second tapered ring with respect to said second cone seat and then to cause said second shaft mechanism to move from said second to said first shaft position.

8. A telescoping rotor shaft mechanism including:
1. first rotor shaft mechanism mounted for rotation about an axis of rotation and shaped to define an annular chamber therewithin concentric about said axis,
2. second shaft mechanism shaped to define axially spaced and angularly opposed cone seats and positioned in said annular chamber and mounted to rotate with said first shaft mechanism about said axis of rotation and to translate with respect thereto along said axis of rotation between a first end position wherein said rotor shaft is retracted and a second end position wherein said rotor is extended and said second shaft mechanism shaped to cooperate with the first shaft mechanism in defining a cylinder piston arrangement therebetween so that said second shaft mechanism can be caused thereby to translate with respect to the first shaft mechanism between its first and second end positions,
3. a first cone ring positioned in said annular chamber and carried by said first shaft mechanism and positioned to coact with one of said second shaft cone seats when said second shaft is in said second end position,
4. and a second cone ring positioned in said annular chamber and actuatable to a position to extend between said shaft members and to engage said second cone seat of said second shaft mechanism when said second shaft mechanism is in said second end position.

9. Telescoping rotor shaft mechanism including:
1. a first shaft of circular cross section positioned to rotate about an axis of rotation,
2. a second shaft member of circular cross section positioned concentrically within said first shaft member and connected thereto for rotation therewith about said axis of rotation and spaced therefrom to define a first annular chamber therebetween,
3. a third shaft member located in said annular chamber and mounted to rotate with said first and second shaft members and to translate with respect thereto along said axis of rotation and shaped to define opposed cone seats in spaced relation along said axis of rotation,
4. a rotor connected to said third shaft member,
5. a fourth shaft member located in said first annular chamber and connected to said third shaft member for translation and rotation therewith and spaced with respect to said second shaft member to define a second annular chamber therebetween,
6. a fixed ring supported in said second shaft member and extending between said second and fourth shaft members to define segments of said second annular chamber on opposite sides thereof,
7. a first conically shaped ring member supported at one end of and by said first shaft member and adapted to matingly engage the first of said cone seats of said third shaft member when said third and fourth shaft members are at one end of their travel in translation,
8. a second conically shaped ring member positioned in said first annular chamber and actuatable to extend between said first and third shaft members and to engage the second conically-shaped seat of said third shaft member when said third and fourth shaft members are in said one end position of translation,
9. sequencing hydraulic means to cause said third and fourth shaft members to translate from a first position wherein the rotor is retracted to a second position wherein the rotor is extended and said first conically shaped ring matingly engages said first cone seat of said third shaft member to prevent further extension of said rotor and then to cause said second conically shaped ring to engage said second cone seat to prevent retraction of said rotor,
10. sequencing hydraulic means to cause said second conical ring to disengage said second cone seat of said third shaft member to release said third and fourth shaft members for translation and to then cause said third and fourth shaft members to translate with respect to said first and second shaft members to said first position wherein said rotor is retracted.

10. Apparatus according to claim 9 and including means to actuate said second conically shaped ring including a sleeve member enveloping said fourth shaft member in spaced relation and shaped to define a hydraulic cylinder piston arrangement therewith and connected to said second tapered ring and, aperture means to selectively conduct hydraulic fluid to said hydraulic cylinder piston mechanism to cause said second tapered ring member to translate along said axis in a first direction to engage said second cone seat of said third shaft member when said third shaft member is in said rotor extended position and to translate in a second direction to disengage said second tapered ring member from engagement with said second cone seat to release said third and fourth shaft members for translation.

11. Telescoping rotor shaft mechanism including:
1. a first rotor shaft mounted for rotation about an axis of rotation, 2. a second rotor shaft mounted to rotate with said first rotor shaft and to translate with respect thereto along said axis of rotation to cause the rotor to be extended or retracted and being shaped to define axially spaced and angularly opposed first and second cone seats, 3. a first conically shaped ring supported from said first shaft and positioned to engage the first cone seat of said second shaft when said second shaft is in the rotor extended position so as to prevent further translation of the second shaft it with respect to the first shaft in a rotor extended direction, 4. a second tapered ring actuatable between a first position wherein said second tapered ring extends between said first and second shafts and engages the second cone seat of said second shaft to coact with said first cone ring in supporting said second shaft in spaced relation along said axis and to lock said second shaft in its rotor extended position and a second position wherein said second shaft is unlocked to translate with respect to said first shaft, 5. first hydraulic cylinder piston means to cause said second shaft to translate with respect to said first shaft between the rotor retracted and the rotor extended positions, 6. second hydraulic cylinder piston means to cause said second cone ring to be actuated between said locked and unlocked positions.

12. Apparatus according to claim 11 and including sequencing means to cause said first hydraulic cylinder piston mechanism to cause said second shaft means to move from the rotor retracted to the rotor extended position and to then cause said second hydraulic cylinder piston means to cause said second conically-shaped ring to move to its lock position, and also to cause said second hydraulic cylinder piston mechanism to cause said second conically-shaped ring to move to its unlocked position and then to cause said second shaft to translate with respect to said first shaft between the rotor extended position and the rotor retracted position.

13. Apparatus according to claim 12 and including positive stop means to limit the translation of said second shaft with respect to said first shaft in both directions.

PO-1050
(5/69)

UNITED STATES PATENT OFFICE
CERTIFICATE OF CORRECTION

Patent No. 3,581,624   Dated June 1, 1971

Inventor(s) ROBERT A. STONE & FREDERICK C. BEURER

It is certified that error appears in the above-identified patent and that said Letters Patent are hereby corrected as shown below:

Claim 9, column 6, line 25   Delete "a fixed ring" and insert --a ring member--

Signed and sealed this 21st day of September 1971.

(SEAL)
Attest:

EDWARD M. FLETCHER, JR.
Attesting Officer

ROBERT GOTTSCHALK
Acting Commissioner of Patents